US012410035B2

(12) United States Patent
Suzuki

(10) Patent No.: US 12,410,035 B2
(45) Date of Patent: Sep. 9, 2025

(54) ELEVATOR SYSTEM CONTROLLING ELEVATORS IN RESPONSE TO CALL INFORMATION FROM A MOBILE TERMINAL

(71) Applicant: Mitsubishi Electric Corporation, Tokyo (JP)

(72) Inventor: Naohiko Suzuki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1462 days.

(21) Appl. No.: 16/490,078

(22) PCT Filed: May 16, 2017

(86) PCT No.: PCT/JP2017/018384
§ 371 (c)(1),
(2) Date: Aug. 30, 2019

(87) PCT Pub. No.: WO2018/211593
PCT Pub. Date: Nov. 22, 2018

(65) Prior Publication Data
US 2020/0062537 A1 Feb. 27, 2020

(51) Int. Cl.
*B66B 1/34* (2006.01)
*B66B 1/14* (2006.01)

(52) U.S. Cl.
CPC .......... *B66B 1/3476* (2013.01); *B66B 1/3446* (2013.01); *B66B 1/3461* (2013.01);
(Continued)

(58) Field of Classification Search
CPC ............ B66B 1/468; B66B 2201/4653; B66B 1/2408; B66B 1/3461; B66B 2201/4615;
(Continued)

(56) References Cited

U.S. PATENT DOCUMENTS 8,020,672 B2 * 9/2011 Lin .......................... B66B 1/34
187/316
2018/0327214 A1 * 11/2018 Armistead ........... G01C 21/206
2020/0062537 A1 * 2/2020 Suzuki ...................... B66B 1/14

FOREIGN PATENT DOCUMENTS

CN 104276462 A 1/2015
ES 2578524 T3 * 7/2016 ............... B66B 1/20
(Continued)

OTHER PUBLICATIONS

Japanese Notice of Reasons for Refusal issued May 19, 2020 in Japanese Application No. 2019-518638.
(Continued)

*Primary Examiner* — Christopher Uhlir
(74) *Attorney, Agent, or Firm* — XSENSUS LLP

(57) ABSTRACT

A mobile terminal (7) has an acceleration sensor (8) and a direction sensor (9). The mobile terminal (7) includes a route specifying unit (11), a calculating unit (13), a determining unit (14), and a communicating unit (16). The calculating unit (13) calculates a feature quantity of a route specified by the route specifying unit (11) on the basis of the route specified by the route specifying unit (11). The communicating unit (16) transmits call information to the communicating device (6) when the determining unit (14) determines that the route specified by the route specifying unit (11) is a boarding route.

10 Claims, 15 Drawing Sheets

(52) U.S. Cl.
CPC ........... *B66B 1/14* (2013.01); *B66B 2201/232* (2013.01); *B66B 2201/4607* (2013.01); *B66B 2201/4684* (2013.01)

(58) Field of Classification Search
CPC ................ B66B 5/0012; B66B 1/2458; B66B 2201/103; B66B 2201/4638; B66B 1/3446; B66B 1/3492; B66B 3/02; B66B 2201/232; B66B 2201/405; B66B 9/16
See application file for complete search history.

(56) References Cited

FOREIGN PATENT DOCUMENTS

| | | | | | |
|---|---|---|---|---|---|
| JP | 2003-226473 | A | | 8/2003 | |
| JP | 2014-118263 | A | | 6/2014 | |
| JP | 2015-16917 | A | | 1/2015 | |
| JP | 2015-132629 | A | | 7/2015 | |
| JP | 2017178474 | A | * | 10/2017 | ........... B66B 1/2458 |
| WO | WO-2009122002 | A1 | * | 10/2009 | ........... B66B 1/2458 |
| WO | WO-2009132696 | A1 | * | 11/2009 | ............. B66B 1/468 |
| WO | WO-2016100293 | A1 | * | 6/2016 | ........... B66B 1/3461 |

OTHER PUBLICATIONS

Office Action issued on Apr. 26, 2021, in corresponding Chinese patent Application No. 201780090033.1, 16 pages.

International Search Report and Written Opinion mailed on Aug. 1, 2017 for PCT/JP2017/018384 filed on May 16, 2017, 7 pages including English Translation of the International Search Report.

Office Action issued on Mar. 30, 2021, in corresponding Korean patent Application No. 10-2019-7033028, 10 pages.

* cited by examiner 27 transmitting device

S201 CALL INFORMATION RECEIVED?
S202 CALL REGISTERED
S203 ASSIGNED CAR DETERMINED
S204 RESPONSE INSTRUCTION TRANSMITTED
S205 INFORMATION ON ASSIGNED CAR TRANSMITTED 7 mobile terminal
8 acceleration sensor
9 direction sensor
10 storage unit
12 receiving unit
19 determining unit
20 route recording unit
21 boarding route specifying unit
22 calculating unit
23 condition creating unit
24 moving time learning unit
27 transmitting device

ELEVATOR SYSTEM CONTROLLING ELEVATORS IN RESPONSE TO CALL INFORMATION FROM A MOBILE TERMINAL

CROSS-REFERENCE TO RELATED APPLICATION

The present application is based on PCT filing PCT/JP2017/018384, filed May 16, 2017, the entire contents of which are incorporated herein by reference.

FIELD

The present invention relates to an elevator system and a mobile terminal.

BACKGROUND

PTL 1 discloses an elevator system. The system disclosed in PTL 1 includes a receiving device configured to receive information from a mobile terminal. The receiving device receives information with different reception intensities from a plurality of communication areas. A call for a user is registered on the basis of the information received by the receiving device.

CITATION LIST

Patent Literature

[PTL 1] Japanese Patent Application Publication No. 2003-226473

SUMMARY

Technical Problem

In the system disclosed in PTL 1, as the communication area is expanded, the receiving device may receive information transmitted from a mobile terminal carried by a person who does not use the elevator. This causes call registration to be wasted.

The present invention is made in order to solve the above problem. An object of the present invention is to provide an elevator system which enables automatic call registration for a user while preventing useless call registration. Another object of the present invention is to provide a mobile terminal for use in the system.

Solution to Problem

An elevator system of the present invention comprises a mobile terminal having an acceleration sensor and a direction sensor, a communicating device configured to wirelessly communicate with the mobile terminal, and registering means configured to register a call on the basis of call information from the mobile terminal, the call information received by the communicating device. The acceleration sensor detects an acceleration of the mobile terminal. The direction sensor detects a particular direction on a horizontal plane. The mobile terminal comprises route specifying means configured to specify a route on which the mobile terminal has moved on the horizontal plane on the basis of at least one of the acceleration detected by the acceleration sensor and the direction detected by the direction sensor, first calculating means configured to calculate a feature quantity of the route specified by the route specifying means on the basis of the route specified by the route specifying means, first determining means configured to determine whether the route specified by the route specifying means is a boarding route for boarding a car on the basis of the feature quantity calculated by the first calculating means, and communicating means configured to transmit the call information to the communicating device when the first determining means determines that the route specified by the route specifying means is the boarding route.

A mobile terminal of the present invention comprises an acceleration sensor configured to detect an acceleration, a direction sensor configured to detect a particular direction on a horizontal plane, route specifying means configured to specify a route on which the mobile terminal has moved on the horizontal plane on the basis of at least one of the acceleration detected by the acceleration sensor and the direction detected by the direction sensor, first calculating means configured to calculate a feature quantity of the route specified by the route specifying means on the basis of the route specified by the route specifying means, first determining means configured to determine whether the route specified by the route specifying means is a boarding route for boarding a car on the basis of the feature quantity calculated by the first calculating means, and communicating means configured to wirelessly transmit call information for requesting for registration of a call when the first determining means determines that the route specified by the route specifying means is the boarding route.

Advantageous Effects of Invention

The elevator system of the present invention includes a mobile terminal, a communicating device, and registering means. The mobile terminal includes route specifying means, first calculating means, first determining means, and communicating means. The first calculating means calculates a feature quantity of a route specified by the route specifying means on the basis of the route specified by the route specifying means. The first determining means determines whether the route specified by the route specifying means is a boarding route for boarding a car on the basis of the feature quantity calculated by the first calculating means. The elevator system of the present invention allows a call for a user to be automatically registered while preventing useless call registration.

DESCRIPTION OF EMBODIMENTS

Figure 1:
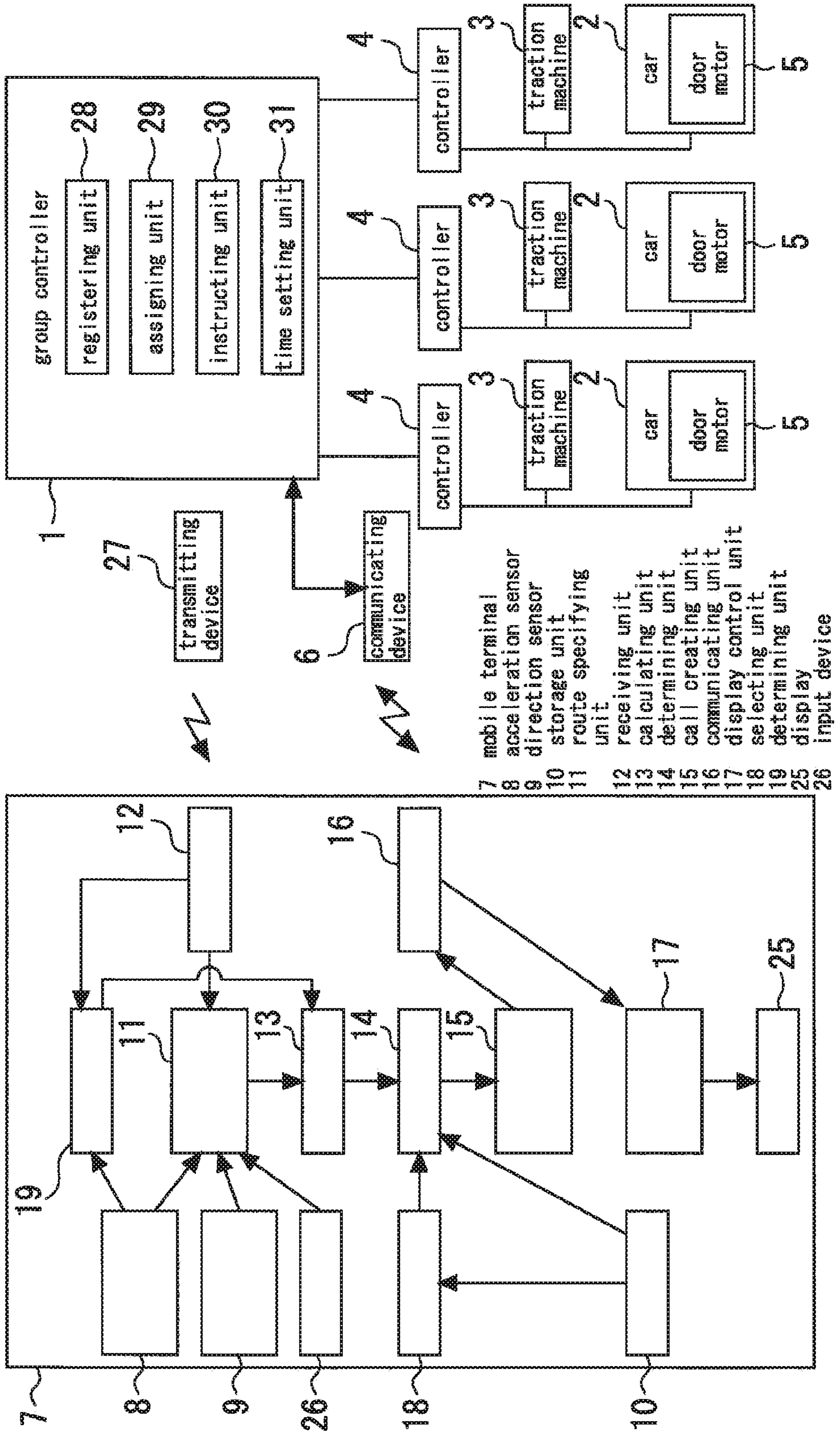
FIG. 1 is a diagram illustrating an example of an elevator system according to a first embodiment of the present invention.

The present invention will be described with reference to the accompanying drawings. Redundant descriptions will be simplified or omitted as appropriate. In the respective drawings, the same reference numerals indicate the same or corresponding portions.

First Embodiment

FIG. 1 is a diagram illustrating an example of an elevator system according to a first embodiment of the present invention. A group controller 1 controls, as a group, a plurality of elevator devices provided in a building or the like. FIG. 1 shows an example in which the group controller 1 controls three elevator devices. Two elevator devices or four or more elevator devices may be controlled by the group controller 1. In the following description, a particular elevator device will be designated with one of A to C as a suffix to be distinguished from the other elevator devices.

Each of the elevator devices controlled by the group controller 1 includes a car 2, a traction machine 3, and a controller 4. For example, an elevator device A includes a car 2A, a traction machine 3A, and a controller 4A. The car 2 moves up and down in a shaft. The car 2 includes a door motor 5 configured to drive doors. The door motor 5 is controlled by the controller 4. The car 2 is driven by the traction machine 3. The traction machine 3 is controlled by the controller 4. The controller 4 controls various devices on the basis of a response instruction received from the group controller 1.

The group controller 1 communicates with an external device through a communicating device 6. For example, the communication device 6 wirelessly communicates with a mobile terminal 7. The communicating device 6 is electrically connected to the group controller 1.

The mobile terminal 7 is a terminal carried by a user. The mobile terminal 7 may be a smart phone. The mobile terminal 7 may be a terminal dedicated to this system. The mobile terminal 7 includes, for example, an acceleration sensor 8, a direction sensor 9, a storage unit 10, a route specifying unit 11, a receiving unit 12, a calculating unit 13, a determining unit 14, a call creating unit 15, and a communicating unit 16.

The acceleration sensor 8 detects an acceleration of the mobile terminal 7. The acceleration sensor 8 detects, for example, a horizontal acceleration and a vertical acceleration. The acceleration sensor 8 detects, for example, an acceleration in an x-axis direction and an acceleration in a y-axis direction as horizontal accelerations. The acceleration sensor 8 detects, for example, an acceleration in a z-axis direction as a vertical acceleration. The directions of the x-axis, the y-axis, and the z-axis are orthogonal to one another.

The direction sensor 9 detects a particular direction on a horizontal plane. The direction sensor 9 detects, for example, a direction of north. An electronic compass using magnetism may be used as the direction sensor 9.

The route specifying unit 11 specifies a route on which the mobile terminal 7 has moved on the horizontal plane. The route specifying unit 11 specifies a movement route on the basis of the acceleration detected by the acceleration sensor 8 and the direction detected by the direction sensor 9. For example, the route specifying unit 11 calculates a movement amount of the mobile terminal 7 in the horizontal direction by integrating accelerations in the x- and y-axis directions detected by the acceleration sensor 8. The route specifying unit 11 specifies the movement route on the basis of the movement amount obtained by the calculation and the direction detected by the direction sensor 9. The route specifying unit 11 specifies the movement route on the basis of at least one of the acceleration detected by the acceleration sensor 8 and the direction detected by the direction sensor 9.

FIG. 1 shows an example in which the system includes a transmitting device 27. The transmitting device 27 wirelessly transmits starting information to a predetermined transmission area. The transmitting device 27 may use a wireless method such as Bluetooth® Low Energy (BLE). The receiving unit 12 receives the starting information transmitted from the transmitting device 27. When the mobile terminal 7 exists in the transmission area of the transmitting device 27, the starting information from the transmitting device 27 is received by the receiving unit 12.

The calculating unit 13 calculates a feature quantity of the route specified by the route specifying unit 11. The calculating unit 13 divides the route specified by the route specifying unit 11 into a plurality of elements. The calculating unit 13 calculates the feature quantity on the basis of each of the elements obtained by the division.

The determining unit 14 determines whether the route specified by the route specifying unit 11 is a boarding route. The boarding route is a route for a user to move on and board into the car 2. A first determination condition for determining that the route specified by the route specifying unit 11 is a boarding route is previously stored in the storage unit 10. The determining unit 14 determines on the basis of the feature quantity calculated by the calculating unit 13.

The call creating unit 15 creates call information used for requesting registering a hall destination call. The call information includes information on a boarding floor and information on a destination floor. The boarding floor is a floor at which a user boards the car 2. The destination floor is a floor at which the user gets off the car 2. The call creating unit 15 creates the call information when the determining unit 14 determines that the route specified by the route specifying unit 11 is a boarding route.

The communicating unit 16 communicates with the communicating device 6. The communicating unit 16 wirelessly transmits the call information created by the call creating unit 15 to the communicating device 6 when the determining unit 14 determines that the route specified by the route specifying unit 11 is a boarding route. The communication between the communicating unit 16 and the communicating device 6 may be carried out by wireless LAN. A public mobile phone network such as 3G and 4G and an Internet network may be used as a communication between the communicating unit 16 and the communicating device 6.

Upon receiving the call information from the mobile terminal 7, the communicating device 6 transmits the received call information to the group controller 1.

Figure 2:
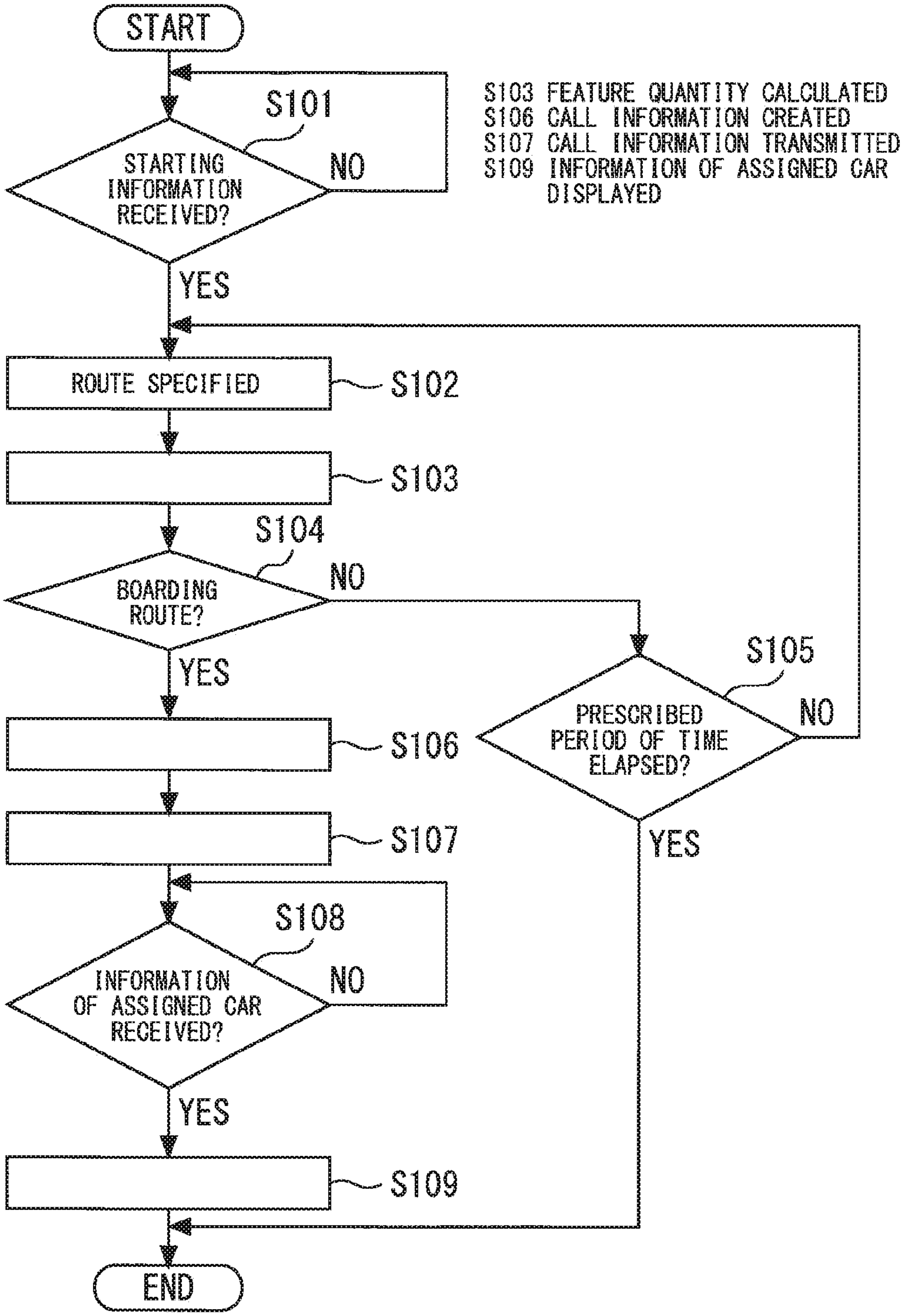
FIG. 2 is a flowchart for illustrating an operation example of a mobile terminal.
Figure 3:
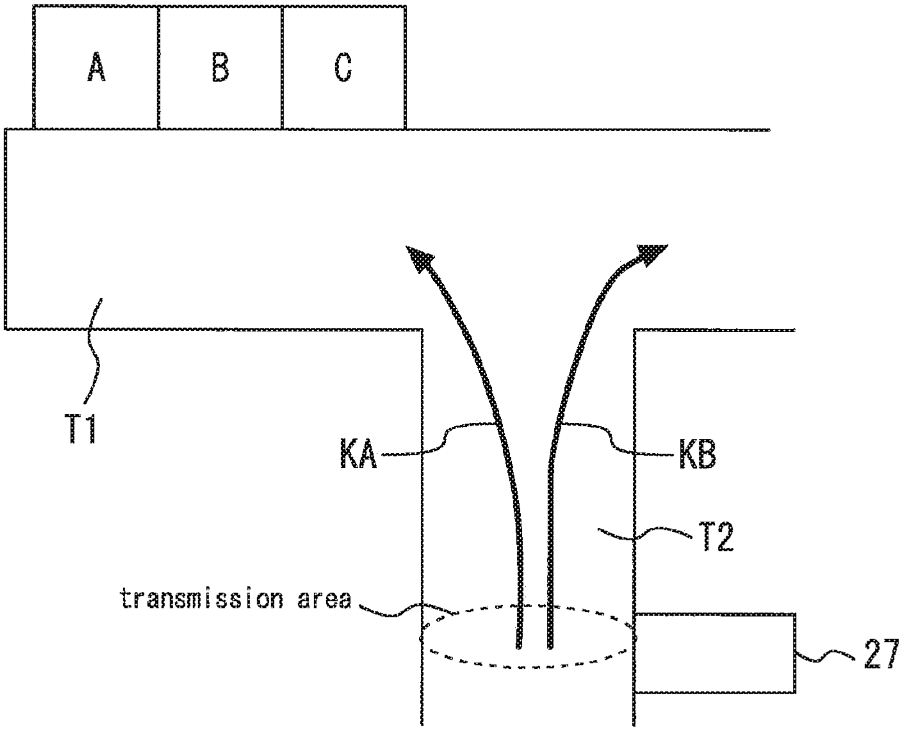
FIG. 3 is a plan view showing an example of a building in which the elevator system shown in FIG. 1 is applied.

With reference to FIGS. 2 to 12, functions and operations of the elevator system will be described in detail. FIG. 2 is a flowchart for illustrating an operation example of the mobile terminal 7. FIG. 3 is a plan view showing an example of a building in which the elevator system shown in FIG. 1 is applied.

In the example shown in FIG. 3, the elevator devices A to C face a passage T1. A passage T2 meets up with the passage T1. The passages T1 and T2 form a T-junction. The transmitting device 27 is provided at a wall of the passage T2. FIG. 3 shows an example in which the transmitting device 27 is provided in a position apart from a hall. The transmitting device 27 may be provided at a wall of the hall. The transmission area of the transmitting device 27 is set so that the mobile terminal 7 receives the starting information when a user carrying the mobile terminal 7 passes in front of the transmitting device 27.

In the mobile terminal 7, it is determined whether starting information from the transmitting device 27 has been received by the receiving unit 12 (S101). The transmitting device 27 transmits starting information at prescribed intervals. When a user carrying the mobile terminal 7 passes in front of the transmitting device 27, the receiving unit 12 receives starting information transmitted from the transmitting device 27.

Figure 4:
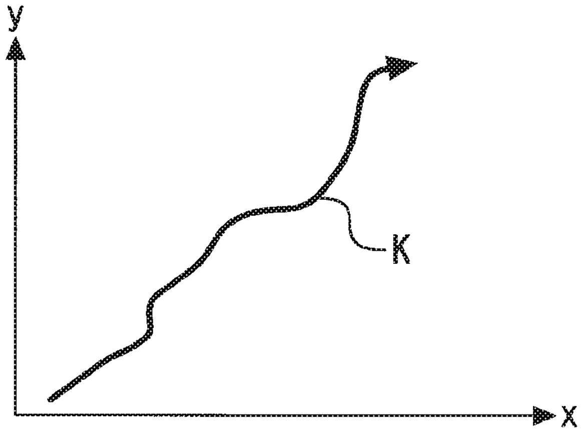
FIG. 4 is an example of a route specified by a route specifying unit.

When the receiving unit 12 receives the starting information, the route specifying unit 11 starts processing for specifying a route on which the mobile terminal 7 has moved on the horizontal plane (S102). For example, when the receiving unit 12 receives the starting information, the acceleration sensor 8 starts to detect an acceleration and the direction sensor 9 starts to detect a direction. The route specifying unit 11 obtains information about the acceleration from the acceleration sensor 8 when the receiving unit 12 receives the starting information. The route specifying unit 11 obtains information about the direction from the direction sensor 9 when the receiving unit 12 receives the starting information. The route specifying unit 11 specifies a movement route of the mobile terminal 7 on the basis of the acceleration detected by the acceleration sensor 8 and the direction detected by the direction sensor 9. FIG. 4 shows an example of the route specified by the route specifying unit 11. In FIG. 4, the route specified by the route specifying unit 11 is designated by K.

Figure 5:
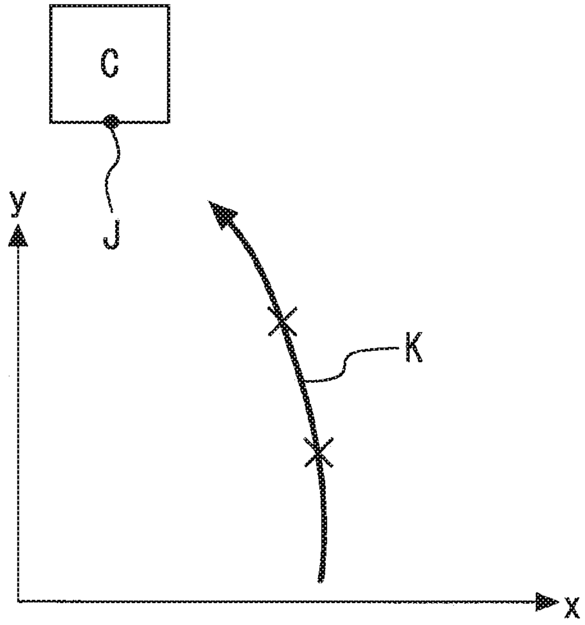
FIG. 5 is a diagram for illustrating functions of a calculating unit.
Figure 6:
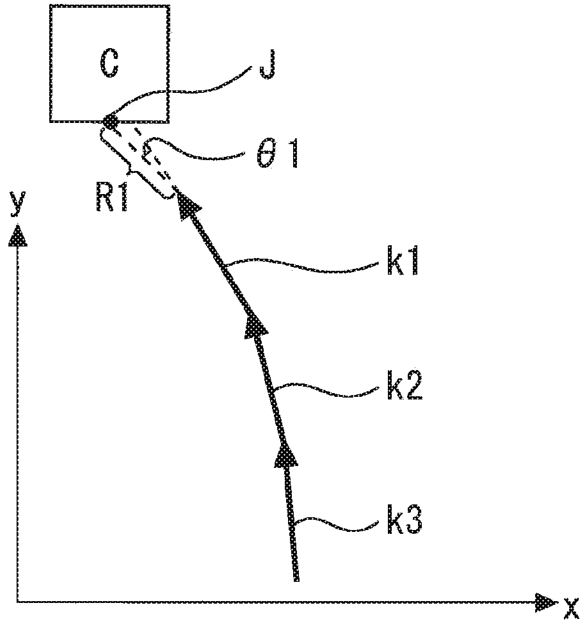
FIG. 6 is a diagram for illustrating functions of the calculating unit.

The calculating unit 13 calculates a feature quantity of the route specified by the route specifying unit 11 (S103). FIGS. 5 to 8 are diagrams for illustrating functions of the calculating unit 13. As illustrated in FIGS. 5 and 6, the calculating unit 13 divides the route K specified by the route specifying unit 11 into a plurality of elements. In the example shown in FIGS. 5 and 6, the route K is divided into elements k1, k2, and k3. In the example in FIG. 6, the elements k1, k2, and k3 are each represented by a straight line vector. The element k1 is the closest to a boarding position J. The element k2 is the second closest to the boarding position J after the element k1. The element k3 is the furthest from the boarding position J. The boarding position J is previously set. This embodiment shows an example in which the boarding position J is set in the center position of the hall doors of the elevator device C. The boarding position J is not limited to the examples shown in FIG. 5 and other figures.

The calculating unit 13 calculates a first index related to a distance and a second index related to an angle as feature quantities of the route specified by the route specifying unit 11. In the following description, the first index is also referred to as a distance R. The second index is also referred to as an angle θ. For example, the distance R is calculated by the following expression 1. The angle θ is calculated by the following expression 2.

[Math. 1]

$$R=\Sigma_{i=1}^{N} liRi \quad (1)$$

$$\theta=\Sigma_{i-1}^{N} mi\theta i \quad (2)$$

Figure 7:
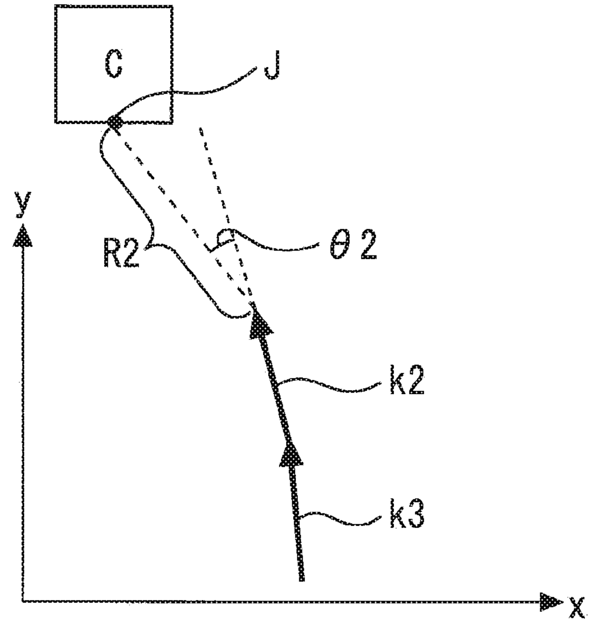
FIG. 7 is a diagram for illustrating functions of the calculating unit.
Figure 8:
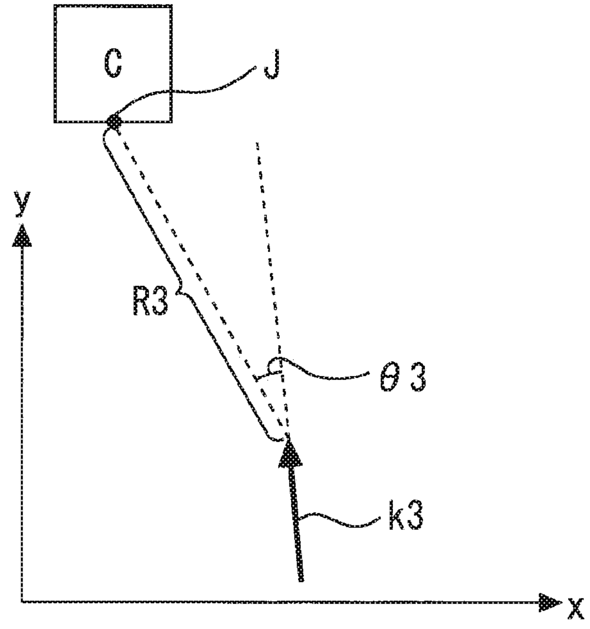
FIG. 8 is a diagram for illustrating functions of the calculating unit.

In expressions 1 and 2, N is the number of elements. In the example shown in FIG. 5. N=3. Ri is a distance from an element. θi is an angle of an element. For example, as shown in FIG. 6, the distance R1 from the element k1 is a distance between an end of the element k1 and the boarding position J. The angle θ1 of the element k1 is an angle formed by the vector of the element k1 and a vector connecting the end of the element k1 and the boarding position J. As shown in FIG. 7, the distance R2 from the element k2 is a distance between an end of the element k2 and the boarding position J. The angle θ2 of the element k2 is an angle formed by the vector of the element k2 and a vector connecting the end of the element k2 and the boarding position J. As shown in FIG. 8, the distance R3 from the element k3 is a distance between an end of the element k3 and the boarding position J. The angle θ3 of the element k3 is an angle formed by the vector of the element k3 and a vector connecting the end of the element k3 and the boarding position J. The characters li and mi represent coefficients. For example, the coefficient li is set to a greater value as the value of i is smaller so that an element closer to the boarding position J is given priority. Similarly, the coefficient mi is set to a greater value as the value of i is smaller.

When the calculating unit 13 calculates the feature quantities, the determining unit 14 determines whether the route specified by the route specifying unit 11 is a boarding route (S104). The determining unit 14 may use the determining method, for example, disclosed in the following non-patent literature.

"The Development of Recognition System of Person Movement Based on RFID and Stereo Camera, Naohiko Suzuki, Kentaro Hayashi, Masafumi Iwata, Takuya Ishioka, and Koichi Sasakawa, Ubiquitous Computing System Study Group, Information Processing Society of Japan, September 2004, 2004-UBI-6"

Figure 9:
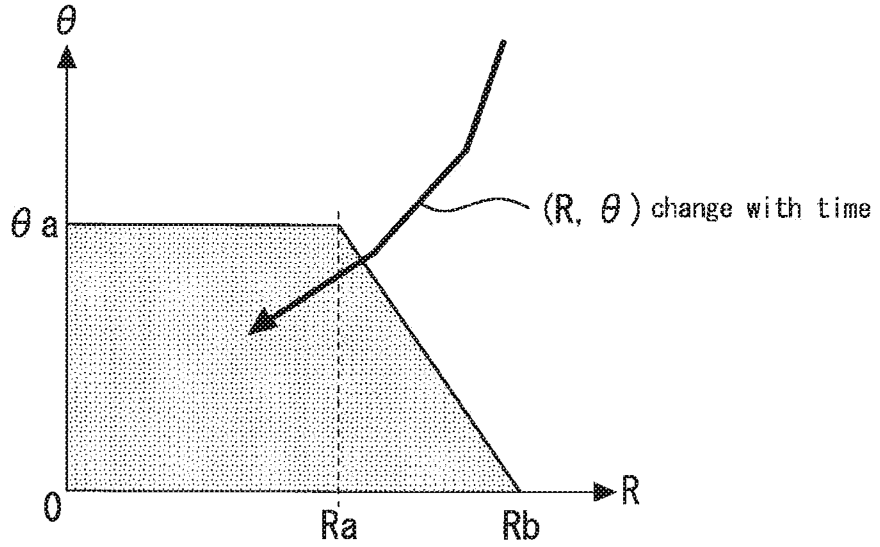
FIG. 9 is a diagram for illustrating functions of a determining unit.
Figure 10:
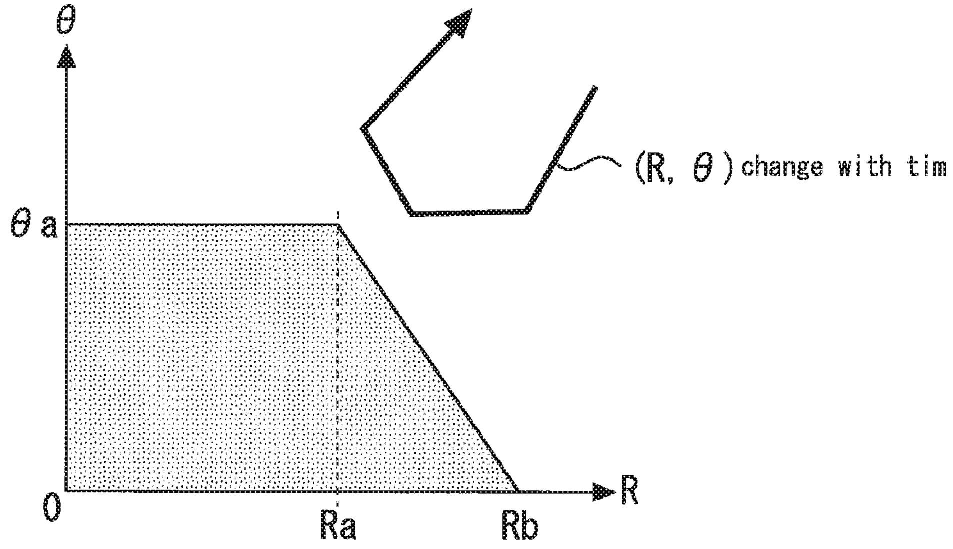
FIG. 10 is a diagram for illustrating functions of the determining unit.

FIGS. 9 and 10 are diagrams for illustrating functions of the determining unit 14. A route KA in FIG. 3 advances straightforward through the passage T2 toward the passage T1 and then curves to the left at the passage T1. FIG. 9 shows change with time in the indexes (R, θ) when the mobile terminal 7 moves on the route KA. In the example shown in FIG. 9, the distance R and the angle θ approach zero with time. For example, the determining unit 14 determines that the route specified by the route specifying unit 11 is a boarding route when the following expression 3 or 4 is satisfied for the indexes (R, θ).

[Math. 2]

$$\begin{cases} R \le Ra \\ \theta \le \theta_a \end{cases} \quad (3)$$

$$\begin{cases} \theta \le \dfrac{\theta_a}{R_a - R_b}(R - R_b) \\ R_a < R \le R_b \end{cases} \quad (4)$$

A route KB shown in FIG. 3 advances straightforward through the passage T2 toward the passage T1, and then curves to the right at the passage T1. FIG. 10 shows change with time in the indexes (R, θ) when the mobile terminal 7 moves on the route KB. In the example in FIG. 10, the values of distance R and the angle θ increase before expression 3 or 4 is satisfied. In the example in FIG. 10, the determining unit 14 does not determine that the route specified by the route specifying unit 11 is a boarding route.

If it is not determined in S104 that the route specified by the route specifying unit 11 is a boarding route, the determining unit 14 determines whether a prescribed period of time has elapsed after the start of processing for specifying the route in S102 (S105). The processing in steps S102 to S105 is repeatedly carried out until the result of determination in S104 or S105 is YES. If the prescribed period elapses and it is not determined by the determining unit 14 that the route specified by the route specifying unit 11 is a boarding route after the start of the processing for specifying the route in S102, the processing ends.

If the result of determination is YES in S104 before the prescribed period elapses after the start of the processing for specifying the route in S102, the call creating unit 15 creates call information (S106). As described above, the call information includes information on a boarding floor and information on a destination floor. The boarding floor is set to a floor provided with the transmitting device 27. When the transmitting device 27 is provided at each of a plurality of floors at which the car 2 stops, each of the transmitting devices 27 transmits starting information including a signal used for specifying the installation floor thereof. For example, the transmitting device 27 provided at the first floor transmits starting information including a floor code of the first floor. In this case, the call creating unit 15 sets a boarding floor on the basis of the starting information received from the transmitting device 27.

The information on the destination floor is previously stored, for example, in the storage unit 10. The call creating unit 15 may set a destination floor from usage data in the past. For example, the call creating unit 15 sets the most frequently used floor as the destination floor. The frequency may be learned in consideration of combinations with boarding floors. In this case, the call creating unit 15 sets the floor used most frequently from the present boarding floor as the destination floor.

The communicating unit 16 wirelessly transmits the call information created by the call creating unit 15 (S107).

Figure 11:
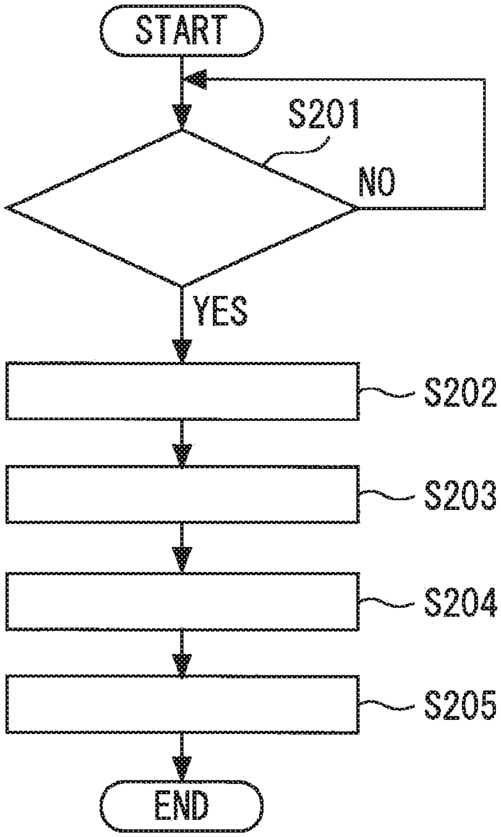
FIG. 11 is a flowchart for illustrating an operation example of a group controller.

FIG. 11 is a flowchart for illustrating an operation example of the group controller 1. As illustrated in FIG. 1, the group controller 1 includes a registering unit 28, an assigning unit 29, and an instructing unit 30. The group controller 1 determines whether call information from the communicating device 6 has been received (S201). Upon receiving call information from the mobile terminal 7, the communicating device 6 transmits the received call information to the group controller 1. The registering unit 28 registers a hall destination call on the basis of the call information received by the communicating device 6 (S202). The assigning unit 29 determines an assigned car 2 to the hall destination call registered in S202 (S203).

When the assigning unit 29 determines the assigned car, the instructing unit 30 transmits, to the controller 4, a response instruction which causes the assigned car to respond to the hall destination call (S204). For example, when the assigned car is a car 2A, the instructing unit 30 transmits the response instruction to the controller 4A. The controller 4 controls the traction machine 3, the door motor 5, and other devices on the basis of the response instruction received from the instructing unit 30.

FIG. 1 shows an example in which the mobile terminal 7 further includes a display control unit 17 and a display 25. The display control unit 17 controls the display 25. When the mobile terminal 7 includes the display 25, the assigning unit 29 determines an assigned car, and then has the communicating device 6 transmit information on the assigned car to the mobile terminal 7 (S205).

When the mobile terminal 7 transmits the call information to the communicating device 6 in S107, it is determined whether information on the assigned car has been received from the communicating device 6 as a response (S108). The information on the assigned car transmitted from the communicating device 6 in S205 is received by the communicating unit 16. The display control unit 17 controls the display 25 to display the information on the assigned car received by the communicating unit 16 (S109). Users can easily understand which car 2 to board by looking at the display 25.

Figure 12:
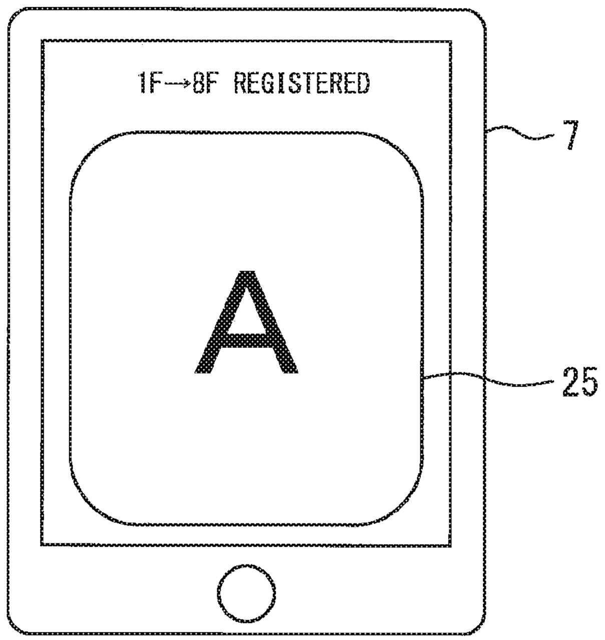
FIG. 12 is a view showing a display example of a display.

FIG. 12 is a view showing a display example of the display 25. The display control unit 17 controls the display 25 to display "A" which refers to the car 2A as the assigned car when, for example, the assigned car is the car 2A. The display control unit 17 may control the display 25 to display information on a hall destination call registered by the group controller 1. For example, when the boarding floor is the first floor and the destination floor is the eighth floor, the display control unit 17 controls the display 25 to display a message such as "1F→8F registered."

In the example according to this embodiment, the determining unit 14 determines whether the route specified by the route specifying unit 11 is a boarding route. When the determining unit 14 determines that the route specified by the route specifying unit 11 is a boarding route, call information created by the call creating unit 15 is transmitted to the communicating device 6. Therefore, a call for a user can be registered automatically. Also in the example according to this embodiment, the movement route of the mobile terminal 7 on the horizontal plane is specified by the route specifying unit 11. The feature quantity of the route specified by the route specifying unit 11 is calculated by the calculating unit 13. The determining unit 14 determinates on the basis of the feature quantity calculated by the calculating unit 13. Therefore, a user boarding the car 2 can be determined with high accuracy, so that useless call registration can be prevented.

Hereinbelow, other functions which may be used in this system will be described.

As shown in FIG. 1, the mobile terminal 7 may further include a selecting unit 18. When the mobile terminal 7 includes the selecting unit 18, a plurality of setting values necessary for calculating a feature quantity are previously stored in the storage unit 10. For example, a plurality of coordinates are stored in the storage unit 10 as the boarding position J. The selecting unit 18 selects one of the plurality of setting values stored in the storage unit 10. The calculating unit 13 calculates a feature quantity using the setting value selected by the selecting unit 18.

When the mobile terminal 7 includes the selecting unit 18, a plurality of first determination conditions necessary for determining a boarding route are previously stored in the storage unit 10. The selecting unit 18 selects one of the plurality of the first determination conditions stored in the storage unit 10. The determining unit 14 determines whether the route specified by the route specifying unit 11 is a boarding route on the basis of the feature quantity calculated by the calculating unit 13 and the first determination condition selected by the selecting unit 18.

For example, depending on the building, the way to get to a hall in some floors may be different from that in the other floors. In the case, a feature quantity must be calculated using an appropriate boarding position J. The first determination condition may desirably be changed depending on the way to get to the hall. For example, when the transmitting device 27 is provided at each of a plurality of floors at which the car 2 stops, the transmitting device 27 wirelessly transmits starting information including a signal used for specifying the installation floor thereof. The selecting unit 18 selects a setting value corresponding to the installation floor of the transmitting device 27 and the first determination condition on the basis of the starting information received by the receiving unit 12.

Figure 13:
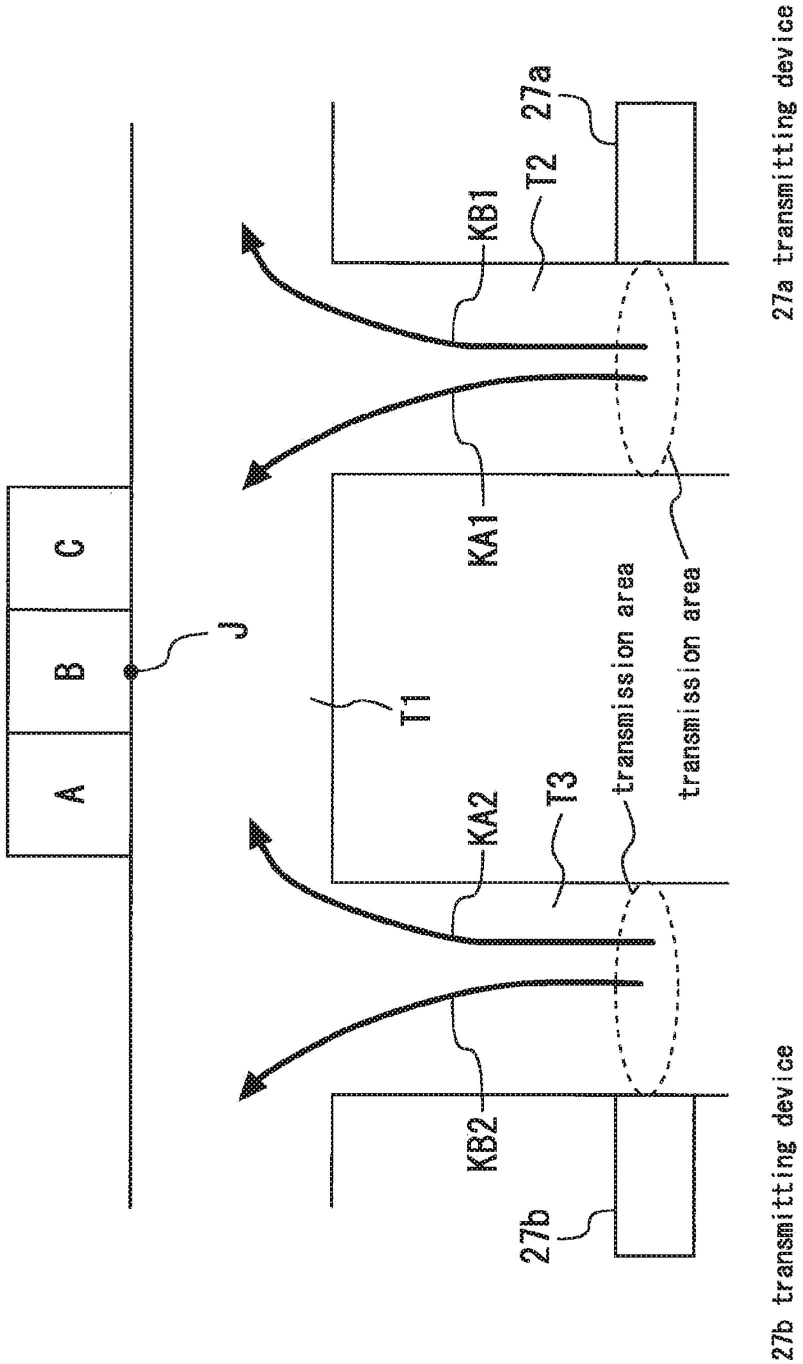
FIG. 13 is a plan view showing another example of a building in which the elevator system shown in FIG. 1 is applied.

FIG. 13 is a plan view showing another example of a building in which the elevator system shown in FIG. 1 is applied. FIG. 13 shows an example of the way to get to a hall not only through the passage T2 but also through the passage T3. The passage T3 meets up with the passage T1. The passages T1 and T3 form a T-junction. In the example shown in FIG. 13, the transmitting device 27*a* is provided at the wall of the passage T2. The transmission area of the transmitting device 27*a* is set so that the mobile terminal 7 receives starting information when a user carrying the mobile terminal 7 passes in front of the transmitting device 27*a*. Similarly, a transmitting device 27*b* is provided at a wall of the passage T3. The transmission area of the transmitting device 27*b* is set so that the mobile terminal 7 receives starting information when a user carrying the mobile terminal 7 passes in front of the transmitting device 27*b*.

A route KA1 shown in FIG. 13 is the same as the route KA shown in FIG. 3. A route KB1 shown in FIG. 13 is the same as the route KB shown in FIG. 3. A route KA2 shown in FIG. 13 advances straightforward through the passage T3 toward the passage T1 and then curves to the right at the passage T1. A route KB2 shown in FIG. 13 advances straightforward through the passage T3 toward the passage T1 and then curved to the left at the passage T1. In the example shown in FIG. 13, the determining unit 14 must determine that the route specified by the route specifying unit 11 is a boarding route when the mobile terminal 7 moves on the route KA1. Similarly, the determining unit 14 must determine that the route specified by the route specifying unit 11 is a boarding route when the mobile terminal 7 moves on the route KA2.

The mobile terminal 7 may include the selecting unit 18 when a plurality of transmitting devices 27 are provided on the same floor. In this case, the transmitting devices 27 each wirelessly transmit starting information including a signal used for specifying the installation position thereof. For example, each of the transmitting devices 27 transmits starting information including a code used for specifying itself. The selecting unit 18 selects a setting value corresponding to the installation position of the transmitting device 27 and a first determination condition on the basis of the starting information received by the receiving unit 12.

As shown in FIG. 1, the mobile terminal 7 may further include a determining unit 19. The determining unit 19 determines whether the mobile terminal 7 has moved in the vertical direction in a particular movement pattern. The determining unit 19 determines on the basis of the vertical acceleration detected by the acceleration sensor 8. For example, when the car 2 moves from one floor to another floor, the car 2 is accelerated, then moved at a constant speed, and then decelerated. The car 2 increases its speed with a constant acceleration, the value of which often ranges from 0.3 $m/s^2$ to 1.0 $m/s^2$. Upon reaching a certain value, the acceleration value as the car 2 increases its speed does not change for a prescribed period of time. Such behavior is the same when the car 2 decelerates. For example, the determining unit 19 determines that the mobile terminal 7 has moved in the vertical direction in the particular movement pattern when the vertical acceleration detected by the acceleration sensor 8 reaches a certain range and then the state continues for a prescribed period of time. More specifically, the determining unit 19 determines that the mobile terminal 7 is in the moving car 2.

Users rarely follow a route to be determined as a boarding route by the determining unit 14 immediately after leaving the car 2. Therefore, when the determining unit 19 determines that the mobile terminal 7 is in the moving car 2, the determining unit 14 does not determine for a prescribed period thereafter that the route specified by the route specifying unit 11 is a boarding route. In this way, a hall destination call can be prevented from being erroneously registered in the group controller 1.

Note that when the acceleration sensor 8 detects change in both the horizontal and vertical accelerations, the route on which the mobile terminal 7 has moved on the horizontal plane may not be specified accurately. In this case, the route specifying unit 11 does not have to specify a route. Alternatively, the determining unit 14 does not have to determine whether the route specified by the route specifying unit 11 is a boarding route.

As shown in FIG. 1, the group controller 1 may further include a time setting unit 31. The time setting unit 31 sets time at which an assigned car is made to stand by in an open-door state.

As described above, the distance R1 is the distance between the end of the element k and the boarding position J. Therefore, when a walking speed of a user is previously set, the time until a user carrying the mobile terminal 7 arrives at the boarding position J can be calculated. The walking speed is set to a value, for example, in the range from 1.0 m/s to 1.2 m/s. The walking speed is previously stored in the storage unit 10. The calculating unit 13 calculates a first arrival time period until a user arrives at the boarding position J using the walking speed stored in the storage unit 10. The call creating unit 15 creates call information including information on the first arrival time period calculated by the calculating unit 13 in addition to the information on the boarding floor and the destination floor when the route specified by the route specifying unit 11 is determined as a boarding route by the determining unit 14. The communicating unit 16 wirelessly transmits the call information created by the call creating unit 15.

In the group controller 1, the assigning unit 29 determines an assigned car in response to a hall destination call. The time setting unit 31 calculates a second arrival time period until the assigned car arrives at the boarding floor when the assigning unit 29 determines the assigned car. The time setting unit 31 sets time resulting from adding the first arrival time period to the present time as expected boarding time when the first arrival time period is longer than the second arrival time period. The instructing unit 30 transmits, to the controller 4, a response instruction for keeping the assigned car in an open-door standby state at the boarding floor until the expected boarding time when the expected boarding time is set by the time setting unit 31. In this way, the assigned car stands by in an open-door state until the expected boarding time after arriving at the boarding floor. When the group controller 1 includes the time setting unit 31, users can be prevented from being late for boarding. Note that when there are a plurality of hall destination calls for the same boarding floor and in the same moving direction for the same assigned car, the time setting unit 31 may set the time resulting from adding the longest first arrival time period to the present time as the expected boarding time.

In the described example according to the embodiment, when the receiving unit 12 receives starting information from the transmitting device 27, the route specifying unit 11 starts processing for specifying a route. In this example, the start of the route can be clear, and the route can be specified accurately. Meanwhile, this is only an example. The route specifying unit 11 may start processing for specifying a route on the basis of any of other conditions.

In the example shown in FIG. 1, the mobile terminal 7 further includes an input device 26. A user inputs information from the input device 26. For example, the user inputs starting information from the input device 26. The input device 26 is, for example, a mechanical button having a contact. The input device 26 may be a touch panel button. These examples are not intended to limit the method for inputting information from the input device 26. The route specifying unit 11 may start processing for specifying a route in S102 when the starting information is input from the input device 26.

The route specifying unit 11 may start processing for specifying a route in S102 when the acceleration sensor 8 detects a particular acceleration pattern. For example, the route specifying unit 11 starts the processing described above when the acceleration sensor 8 consecutively detects accelerations greater than or equal to a prescribed value. In this example, a user may vibrate the mobile terminal 7 to transmit call information to the group controller 1 when the user desires to use the elevator device.

The route specifying unit 11 may start processing for specifying a route in S102 when wireless IC card authentication is carried out. The function of the wireless IC card may be provided in the mobile terminal 7. A user may carry the wireless IC card separately from the mobile terminal 7. When the mobile terminal 7 is provided with the wireless IC card function, the user places the mobile terminal 7 over a card reader, a security gate or the like. When the mobile terminal 7 is provided with the wireless IC card function, the communicating method may be NFC (Near Field Communication) which is a short-distance wireless communication system.

In the described example according to the embodiment, when the receiving unit 12 receives starting information from the transmitting device 27, the route specifying unit 11 always starts processing for specifying a route. Meanwhile, this is only an example. The function of automatically registering a call may be valid only for a particular period of time. The function of automatically registering a call may be valid only at a particular floor or a particular hall. When the automatic registration function is not valid, users may manually input a destination floor from the mobile terminal 7.

Figure 14:
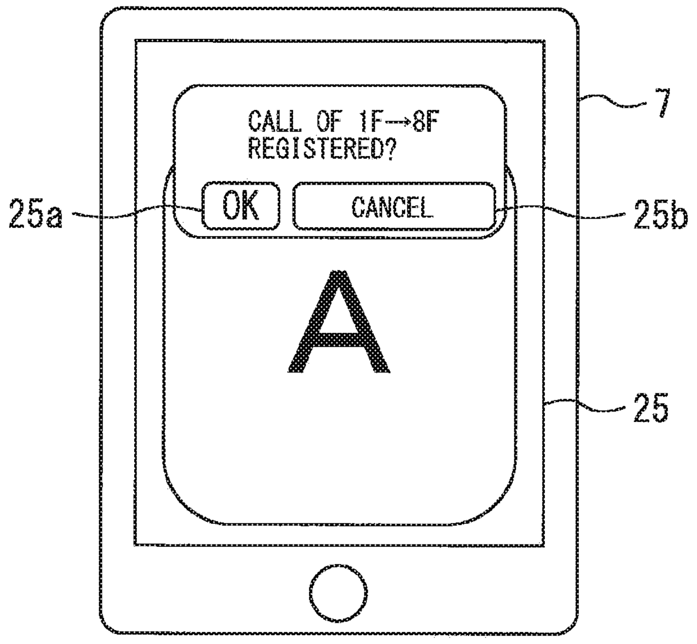
FIG. 14 is a view showing another display example of the display.

In the described example according to the embodiment, the display control unit 17 controls the display 25 to display information on an assigned car. The display control unit 17 may control the display 25 to display other kinds of information. FIG. 14 is a view showing another display example of the display 25. The display control unit 17 controls the display 25 to display a method for acknowledging and cancelling call registration when the communicating unit 16 receives the information on an assigned car from the communicating device 6. When an operation for acknowledging the call registration is carried out, the communicating unit 16 transmits information for confirming the call registration, in other words, confirmation information to the communicating device 6. In this case, the instructing unit 30 in the group controller 1 transmits a response instruction to the controller 4 after the communicating device 6 receives the confirmation information. Meanwhile, when an operation of cancelling the call registration is carried out, the communicating unit 16 transmits information for canceling the call registration, in other words, cancel information to the communicating device 6. When the communicating device 6 receives the cancel information from the mobile terminal 7, the group controller 1 cancels the hall destination call registered in S202.

For example, the display control unit 17 controls the display 25 to display an OK button **25*a* and a cancel button 25*b* when the communicating unit 16 receives information on an assigned car from the communicating device 6. When the OK button 25*a* is pressed, the communicating unit 16 transmits confirmation information to the communicating device 6. When the cancel button 25*b* is pressed, the communicating unit 16 transmits cancel information to the communicating device 6. When the cancel button 25*b* is pressed, the display control unit 17 may control the display 25 to display guidance or the like for manually transmitting call information. In this example, the car 2** can be prevented from responding to an irrelevant call. Also, an erroneously registered call if any can quickly be canceled.

In the described example according to the embodiment, the calculating unit 13 calculates the distance R and the angle θ as feature quantities of a route. More specifically, the calculating unit 13 calculates the distance R using the position of a point on each element and a boarding position. The calculating unit 13 calculates the angle θ using the vector representing each element and a vector connecting the position of the point on the element and the boarding position. In this example, the determination accuracy by the determining unit 14 can be improved. Meanwhile, this is merely an example. The calculating unit 13 may calculate only the distance R as a feature quantity of a route. The calculating unit 13 may calculate only the angle θ as a feature quantity of a route. Alternatively, the calculating unit 13 may calculate a change ratio in the angle θ as a feature quantity of a route. The calculating unit 13 may calculate a horizontal speed as a feature quantity of a route. Note that when the calculating unit 13 calculates only the distance R, the end point of the route needs only be determined, and the entire route does not have to be specified.

In the described example according to the embodiment, the calculating unit 13 calculates a feature quantity on the basis of a plurality of elements. Meanwhile, this is merely an example. The calculating unit 13 may calculate a feature quantity only on the basis of the newest element. The calculating unit 13 may calculate a feature quantity using the route specified by the route specifying unit 11 as is without dividing the route.

Second Embodiment

Figure 15:
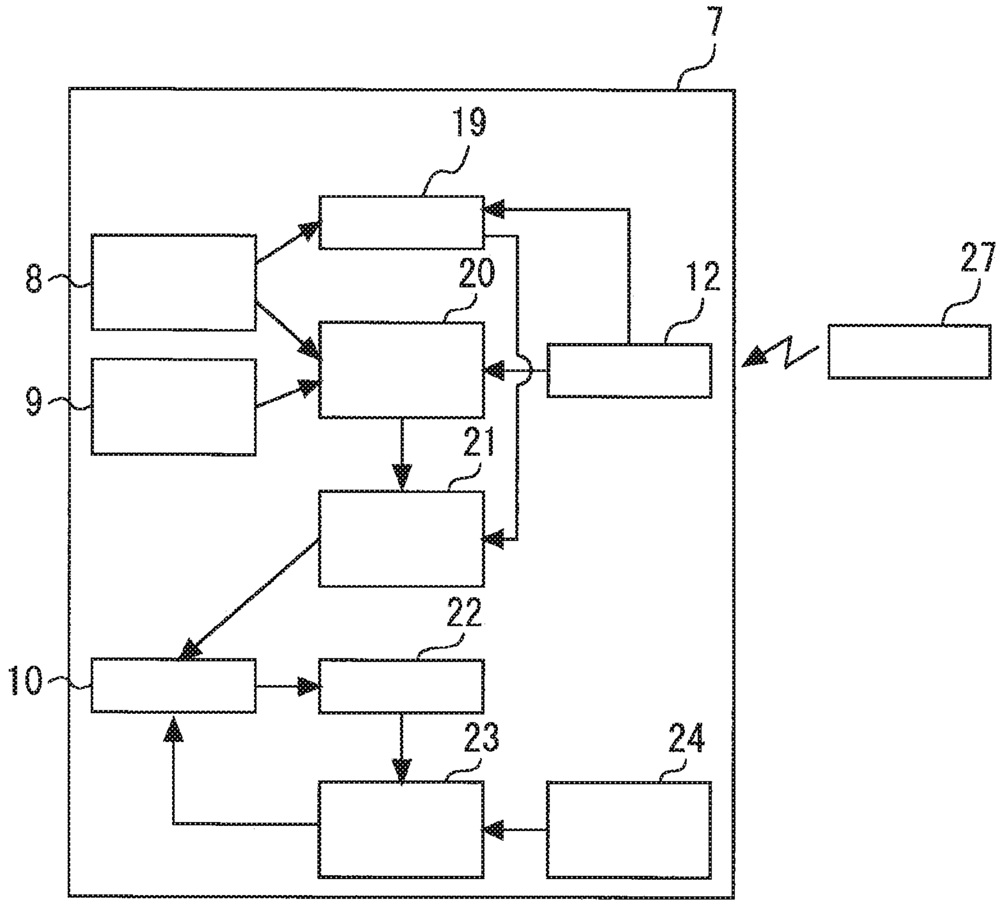
FIG. 15 is a diagram illustrating an example of an elevator system according to a second embodiment of the present invention.

In the following example according to this embodiment, a system includes functions of creating a first determination condition. FIG. 15 is a diagram illustrating an example of an elevator system according to a second embodiment of the present invention. FIG. 15 shows only functions necessary for creating the first determination condition. The mobile terminal 7 further includes, for example, a route recording unit 20, a boarding route specifying unit 21, a calculating unit 22, and a condition creating unit 23. Note that the elevator system according to this embodiment includes all the devices and functions disclosed in the first embodiment. In the example shown in FIG. 15, some of the devices and functions necessary for automatically registering a hall destination call are not shown.

As described above, the acceleration sensor 8 detects the acceleration of the mobile terminal 7. The direction sensor 9 detects a particular direction on a horizontal plane. The receiving unit 12 receives starting information transmitted from the transmitting device 27. The determining unit 19 determines whether the mobile terminal 7 has moved in the vertical direction in a particular movement pattern.

The route recording unit 20 records a route on which the mobile terminal 7 has moved on a horizontal plane. The route recording unit 20 records a movement route on the basis of the acceleration detected by the acceleration sensor 8 and the direction detected by the direction sensor 9. For example, the route recording unit 20 integrates accelerations in the x-axis direction and accelerations in the y-axis direction detected by the acceleration sensor 8 and calculates a horizontal movement amount of the mobile terminal 7. The route recording unit 20 records a movement route on the basis of the movement amount obtained by the calculation and the direction detected by the direction sensor 9. The route recording unit 20 records a movement route on the basis of at least one of the acceleration detected by the acceleration sensor 8 and the direction detected by the direction sensor 9.

FIG. 15 shows an example in which the system includes the transmitting device 27. As described above, the transmitting device 27 wirelessly transmits starting information to a predetermined transmission area. When the mobile terminal 7 exists in the transmission area of the transmitting device 27, the starting information from the transmitting device 27 is received by the receiving unit 12.

When the determining unit 19 determines that the mobile terminal 7 has moved in the vertical direction in the particular movement pattern, the boarding route specifying unit 21 specifies a route recorded immediately before by the route recording unit 20 as a boarding route. The route specified as a boarding route by the boarding route specifying unit 21 is recorded in the storage unit 10.

The calculating unit 22 calculates a feature quantity of the route specified as a boarding route by the boarding route specifying unit 21. The calculating unit 22 divides the route specified as a boarding route by the boarding route specifying unit 21 into a plurality of elements. The calculating unit 22 calculates the feature quantity on the basis of each of the elements obtained by the division.

The condition creating unit 23 creates a first determination condition to be used by the determining unit 14 to determine a route as a boarding route. The condition creating unit 23 creates the first determination condition on the basis of the feature quantity calculated by the calculating unit 22. The condition creating unit 23 has the storage unit 10 store the created first determination condition. The determining unit 14 carries out determination shown in S104 in FIG. 2 on the basis of the first determination condition created by the condition creating unit 23.

Figure 16:
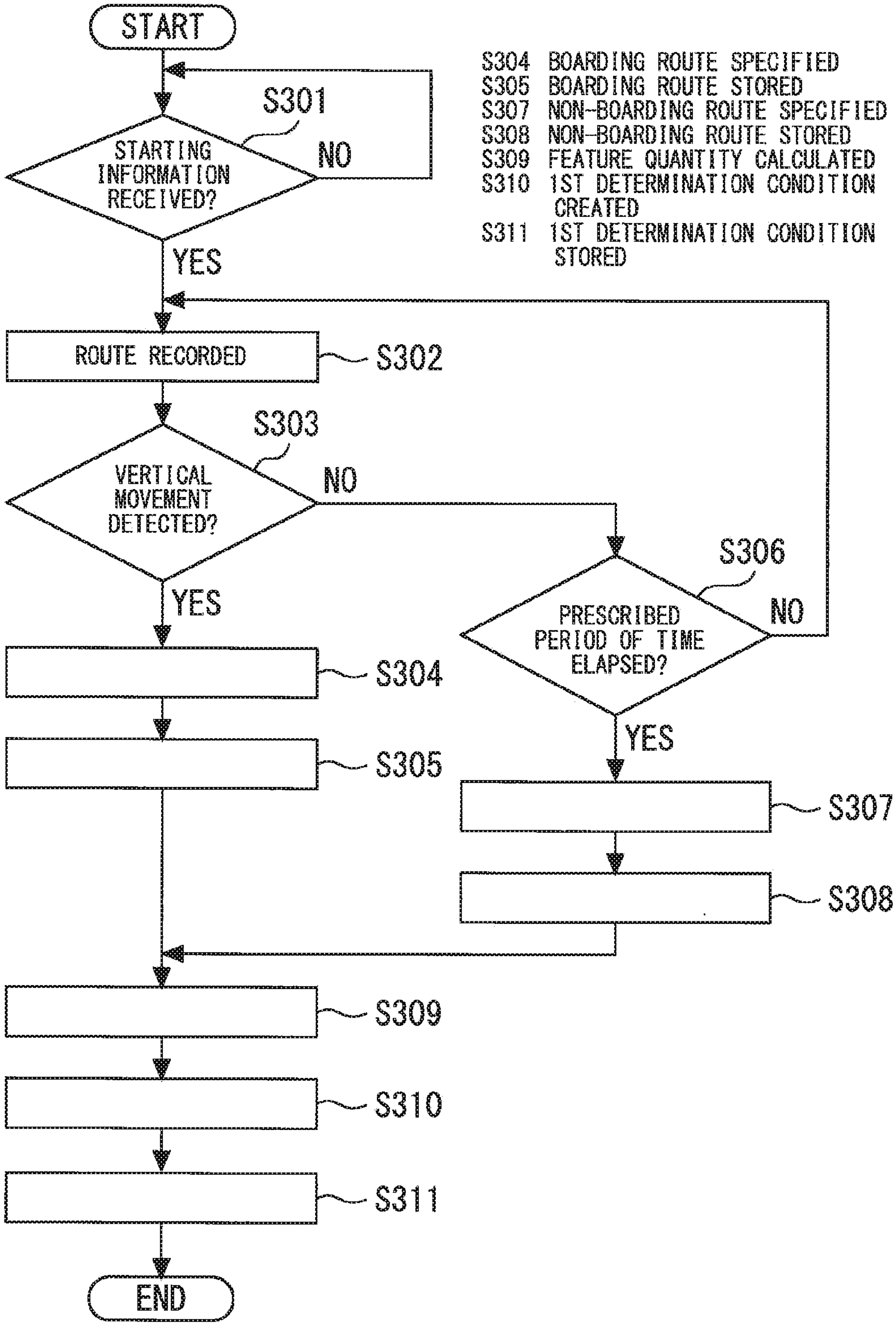
FIG. 16 is a flowchart for illustrating an operation example of the mobile terminal.
Figure 17:
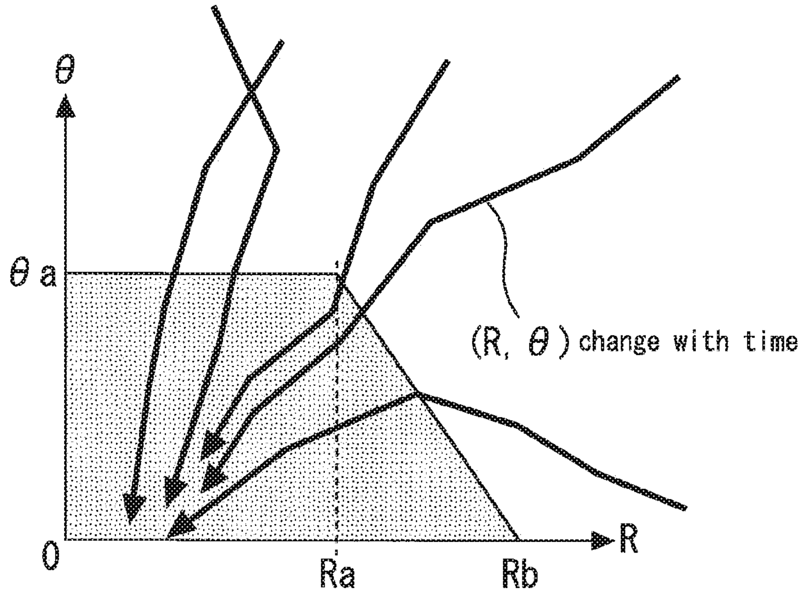
FIG. 17 is a diagrams for illustrating functions of a condition creating unit.
Figure 18:
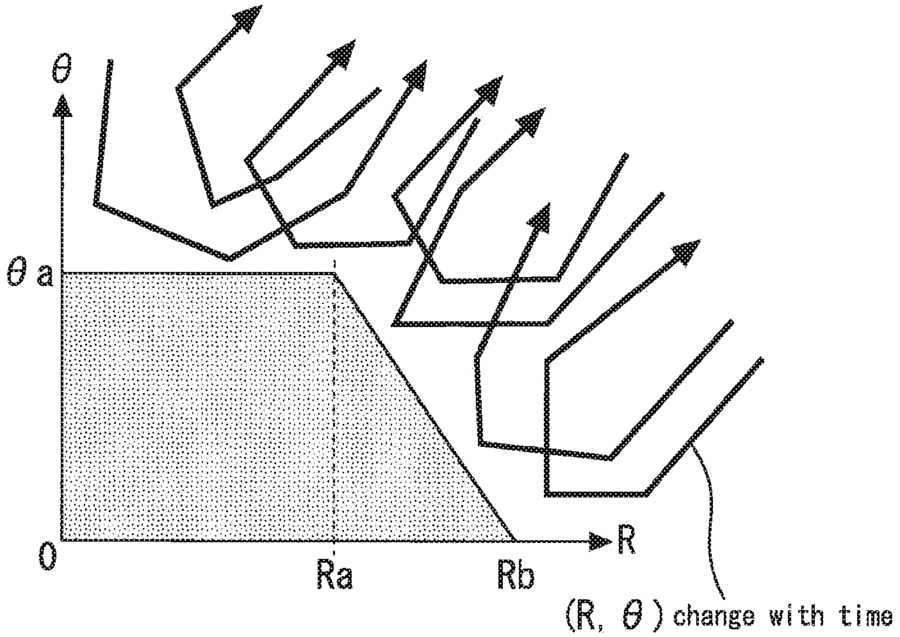
FIG. 18 is a diagrams for illustrating functions of the condition creating unit.

With reference also to FIGS. 16 to 18, functions and operations of the elevator system will be described in detail. FIG. 16 is a flowchart for illustrating an operation example of the mobile terminal 7.

The mobile terminal 7 determines whether starting information from the transmitting device 27 has been received by the receiving unit 12 (S301). When a user carrying the mobile terminal 7 passes in front of the transmitting device 27, the starting information transmitted from the transmitting device 27 is received by the receiving unit 12.

The route recording unit 20 starts processing for recording a route on which the mobile terminal 7 has moved on a horizontal plane when the receiving unit 12 receives the starting information (S302). For example, when the receiving unit 12 receives the starting information, the acceleration sensor 8 starts to detect an acceleration and the direction sensor 9 starts to detect a direction. When the receiving unit 12 receives the starting information, the route recording unit 20 obtains information on the acceleration from the acceleration sensor 8. The route recording unit 20 obtains information on the direction from the direction sensor 9 when the receiving unit 12 receives the starting information. The route recording unit 20 specifies a movement route of the mobile terminal 7 on the basis of the acceleration detected by the acceleration sensor 8 and the direction detected by the direction sensor 9 and records the specified route.

The determining unit 19 determines whether the mobile terminal 7 has moved in the vertical direction in a particular movement pattern when the receiving unit 12 receives starting information (S303). The determining unit 19 carries out determination on the basis of the vertical acceleration detected by the acceleration sensor 8. As described above, when the car 2 moves from one floor to another floor, the car 2 is accelerated, then moved at a constant speed, and then decelerated. The car 2 is accelerated with a constant acceleration, the value of which is often in the range from 0.3 $m/s^2$ to 1.0 $m/s^2$. Furthermore, the value of the acceleration of the accelerated car 2 becomes unchanged for a prescribed period of time after reaching a certain value. Such behavior is the same for the car 2 during deceleration. For example, the determining unit 19 determines that the mobile terminal 7 has moved in the vertical direction in the particular movement pattern when an acceleration in the vertical direction detected by the acceleration sensor 8 is within a certain range and then the state continues for a prescribed period of time. In other words, the determining unit 19 determines that the mobile terminal 7 is in the moving car 2.

When the determining unit 19 determines that the mobile terminal 7 has moved in the vertical direction in the particular movement pattern, the boarding route specifying unit 21 specifies the route recorded immediately before by the route recording unit 20 as a boarding route (S304). The boarding route specifying unit 21 has the route specified as a boarding route stored in the storage unit 10 (S305).

The boarding route specifying unit 21 determines whether a prescribed period of time has elapsed after the start of the processing for recording a route in S302 when the determining unit 19 does not determine that the mobile terminal 7 has moved in the vertical direction in the particular movement pattern (S306). The processing shown in S302, S303, and S306 is repeatedly carried out until the result of the processing shown in S303 or S306 is YES. When the result of the determination in S303 is not YES after the elapse of the prescribed period of time from the start of recording of the route by the route recording unit 20 in S302, the boarding route specifying unit 21 specifies the route recorded immediately before by the route recording unit 20 as a non-boarding route (S307). The non-boarding route is a route on which a user who does not board the car 2 moves. The boarding route specifying unit 21 has the storage unit 10 store the route specified as a non-boarding route (S308).

The calculating unit 22 calculates a feature quantity of the route stored as a boarding route in the storage unit 10. Similarly, the calculating unit 22 calculates a feature quantity of the route stored as a non-boarding route in the storage unit 10 (S309). The calculating unit 22 may calculate the feature quantity in the same manner as the calculating unit 13 calculates a feature quantity. For example, the calculating unit 22 divides the route stored as a boarding route in the storage unit 10 into a plurality of elements. The calculating unit 22 calculates a feature quantity of the route on the basis of the elements obtained by the division. For example, the calculating unit 22 calculates a first index related to a distance and a second index related to an angle as feature quantities of the boarding route. Similarly, the calculating unit 22 divides the route stored as a non-boarding route in the storage unit 10 into a plurality of elements. The calculating unit 22 calculates a feature quantity of the route on the basis of the elements obtained by the division. For example, the calculating unit 22 calculates a first index related to a distance and a second index related to an angle as feature quantities of the non-boarding route.

The condition creating unit 23 creates a first determination condition on the basis of the feature quantities calculated by the calculating unit 22 (S310). For example, the condition creating unit 23 creates a first determination condition as represented by expressions 3 and 4. In this case, the condition creating unit 23 determines values for Ra. Rb, and θa on the basis of the feature quantities calculated by the calculating unit 22.

FIGS. 17 and 18 are diagrams for illustrating functions of the condition creating unit 23. FIG. 17 shows change with time in the feature quantities of boarding routes. The condition creating unit 23 sets the first determination condition so that each of lines representing change with time in the feature quantities of the boarding routes enters the range for the determining unit 14 to determine the boarding route from the outside. FIG. 18 shows change with time in the feature quantities of non-boarding routes. The condition creating unit 23 sets the first determination condition so that each of lines representing change with time in the feature quantities of the non-boarding routes does not enter the range for the determining unit 14 to determine a boarding route.

Note that the condition creating unit 23 may create the first determination condition so that the area of the range for the determining unit 14 to determine a boarding route is maximized. The condition creating unit 23 may create the first determination condition so that the distance R is given priority over the angle θ. The condition creating unit 23 may create the first determination condition so that the angle θ is given priority over the distance R. The condition creating unit 23 may create the first determination condition so that the determination error by the determining unit 14 is not more than a prescribed value. For example, the condition creating unit 23 creates the first determination condition so that the determination error by the determining unit 14 is not more than 5%. The condition creating unit 23 has the created first determination condition stored in the storage unit 10 (S311).

In the example according to the embodiment, the calculating unit 22 calculates the feature quantities of the route specified as a boarding route by the boarding route specifying unit 21. The condition creating unit 23 creates the first determination condition on the basis of the feature quantities calculated by the calculating unit 22. Therefore, it is not necessary to previously set map information on each floor, positional information on the transmitting device 27 and the like. The first determination condition can be created only by using the relative positional relation between the transmitting device 27 and the mobile terminal 7. In the example according to the embodiment, when the determining unit 19 determines that the mobile terminal 7 has moved in the vertical direction in the particular movement pattern, the route recorded immediately before by the route recording unit 20 is specified as a boarding route. Therefore, the boarding route can be specified accurately.

Other functions which can be used in this system will be described.

As shown in FIG. 15, the mobile terminal 7 may further include a moving time learning unit 24. The moving time learning unit 24 learns a first arrival time period for a user to arrive at the boarding position J from a position in which the first determination condition created by the condition creating unit 23 is satisfied. The moving time learning unit 24 has a learning result, for example, stored in the storage unit 10. In this case, the call creating unit 15 creates call information including information on the first arrival time period stored in the storage unit 10 when the determining unit 14 determines that the route specified by the route specifying unit 11 is a boarding route. The communicating unit 16 wirelessly transmits the call information created by the call creating unit 15.

When the transmitting device 27 is provided at each of a plurality of floors of a building, the condition creating unit 23 may create a first determination condition for each of the floors provided with the transmitting device 27. For example, when the transmitting device 27 is provided at each of the floors at which the car 2 stops, each of the transmitting devices 27 wirelessly transmits starting information including a signal used for specifying the installation floor thereof. For example, the transmitting device 27 provided at the first floor transmits starting information including a floor code of the first floor.

When the transmitting devices 27 are provided in a plurality of positions on a horizontal plane, the condition creating unit 23 may create a first determination condition for each of the installation positions of the transmitting devices 27. For example, when a plurality of transmitting devices 27 are provided at the same floor of a building, the condition creating unit 23 creates a first determination condition for each of the installation positions of the transmitting devices 27. In this case, each of the transmitting devices 27 wirelessly transmits starting information including a signal used for specifying the installation position thereof. For example, each of the transmitting devices 27 transmits starting information including a code used for specifying itself.

In the described example according to the embodiment, the mobile terminal 7 is provided with functions necessary for creating the first determination condition. This is merely an example. Some or all of the route recording unit 20, the boarding route specifying unit 21, the calculating unit 22, and the condition creating unit 23 may be included in a server as a discrete device from the mobile terminal 7. The server may include a function corresponding to the storage unit 10 and a function corresponding to the determining unit 19. The server may include the moving time learning unit 24.

For example, the mobile terminal 7 includes the boarding route specifying unit 21. The server may include the calculating unit 22 and the condition creating unit 23. The boarding route specifying unit 21 has a route specified as a boarding route stored in a storage unit included in the server. The boarding route specifying unit 21 has a route specified as a non-boarding route stored in the storage unit included in the server. The condition creating unit 23 transmits information on the created first determination condition to the mobile terminal 7. In this way, the first determination condition created by the condition creating unit 23 is stored in the storage unit 10 of the mobile terminal 7.

In this example, the server may obtain route information from a plurality of mobile terminals 7. The condition creating unit 23 may create a first determination condition for each of the mobile terminals 7. The condition creating unit 23 may create a first determination condition which is common among the plurality of mobile terminals 7.

In the described example according to the embodiment, the determining unit 19 determines that the mobile terminal 7 has moved in the vertical direction in a particular movement pattern when a certain movement condition is satisfied. The determining unit 19 may determine that the mobile terminal 7 has moved in the vertical direction in the particular movement pattern when another movement condition is satisfied. For example, the determining unit 19 may determine that the mobile terminal 7 has moved in the vertical direction in the particular movement pattern when the mobile terminal 7 has moved in the vertical direction for a prescribed distance. The determining unit 19 may determine that the mobile terminal 7 has moved in the vertical direction in the particular movement pattern when the vertical speed of the mobile terminal 7 changes at least by a prescribed value. The determining unit 19 may determine that the mobile terminal 7 has moved in the vertical direction in the particular movement pattern when two of the above three movement conditions are satisfied. The determining unit 19 may determine that the mobile terminal 7 has moved in the vertical direction in the particular movement pattern when all the three conditions are satisfied. The determining method by the determining unit 19 may be applied to the example according to the first embodiment. According to the illustrated examples, the user's movement in the car 2 can be determined more accurately.

Users rarely moves on a route which is valid as a sample for specifying a boarding or non-boarding route immediately after getting off from the car 2. Therefore, the route recording unit 20 does not have to record a route for a prescribed period of time after the determining unit 19 determines that the mobile terminal 7 has moved in the vertical direction in the particular movement pattern. The route recording unit 20 does not have to record a route until the mobile terminal 7 is without a particular range when the determining unit 19 determines that the mobile terminal 7 has moved in the vertical direction in the particular movement pattern. The particular range is set, for example, on the basis of the distance from the boarding position J. In this way, the route immediately after the user gets off from the car 2 may be excluded from a boarding route and a non-boarding route, so that a highly accurate first determination condition can be produced.

In the described example according to the embodiment, the boarding route specifying unit 21 specifies a route as a non-boarding route in S306 when a particular condition is satisfied. When another particular condition is satisfied, the boarding route specifying unit 21 may specify a route recorded immediately before by the route recording unit 20 as a non-boarding route. For example, when the route recording unit 20 records a route for a prescribed distance but the determining unit 19 does not determine that the mobile terminal 7 has moved in the vertical direction in a particular movement pattern, the boarding route specifying unit 21 may specify the route as a non-boarding route. When the movement of the mobile terminal 7 away from the boarding position J is detected before the determining unit 19 determines that the mobile terminal has moved in the vertical direction in the particular movement pattern, the boarding route specifying unit 21 may specify a non-boarding route. The boarding route specifying unit 21 may specify a non-boarding route when two of the above three particular conditions are satisfied. The boarding route specifying unit 21 may specify a non-boarding route when all the three movement conditions are satisfied. Note that the boarding route specifying unit 21 may specify only a boarding route. Meanwhile, when the boarding route specifying unit 21 specifies both boarding and non-boarding routes, a highly accurate first determination condition can be produced.

In the described examples according to the first and second embodiments, the elevator system includes the group controller 1. The system may include only one elevator device. In this case, the controller 4 of the elevator device is provided with the registering unit 28, the instructing unit 30, and the time setting unit 31.

Figure 19:
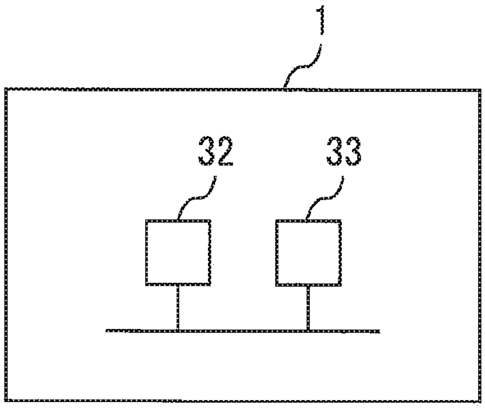
FIG. 19 is a diagram showing an example of a hardware configuration of the group controller.

The units designated by reference numerals 28 to 31 are the functions of the group controller 1. FIG. 19 is a diagram showing an example of a hardware configuration of the group controller 1. The group controller 1 includes processing circuitry including, for example, a processor 32 and a memory 33 as hardware resources. The group controller 1 implements the function of each of the units designated by 28 to 31 as the processor 32 executes a program stored in the memory 33.

Figure 20:
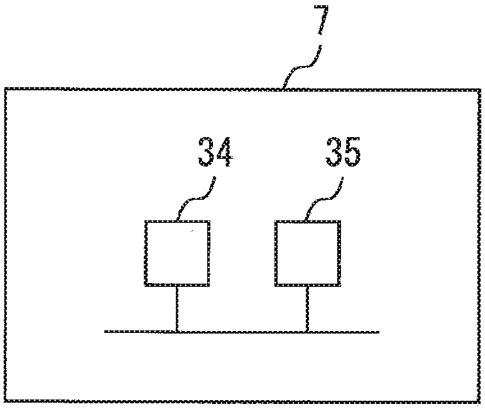
FIG. 20 is a diagram showing an example of a hardware configuration of the mobile terminal.

The units designated by reference numerals 10 to 24 are the functions of the mobile terminal 7. FIG. 20 is a diagram showing an example of a hardware configuration of the mobile terminal 7. The mobile terminal 7 includes processing circuitry including, for example, a processor 34 and a memory 35 as hardware resources. The function of the storage unit 10 is implement by the memory 35. The mobile terminal 7 implements the function of each of the units designated by reference numerals 11 to 24 as the processor 34 executes a program stored in the memory 35.

The processors 32 and 34 are each also referred to as a CPU (Central Processing Unit), a central processor, a processing device, an arithmetic device, a microprocessor, a microcomputer or a DSP As each of the memory 33 and the memory 35, a semiconductor memory, a magnetic disk, a flexible disk, an optical disk, a compact disk, a minidisk or a DVD may be adopted. The available semiconductor memory may include a RAM, a ROM, a flash memory, an EPROM and an EEPROM.

A part of or all of each of the functions included in the group controller 1 may be implemented by hardware. A part of or all of each of the functions included in the mobile terminal 7 may be implemented by hardware. As the hardware for implementing the functions included in the group controller 1 and the functions included in the mobile terminal 7, a single circuit, a composite circuit, a programmed processor, a parallel-programmed processor, an ASIC, an FPGA or a combination of thereof may be adopted.

INDUSTRIAL APPLICABILITY

The present invention is applicable to an elevator system which automatically registers a call.

| Reference Signs List |
|---|
| 1 group controller, 2 car, 3 traction machine, 4 controller, 5 door motor, 6 communicating device, 7 mobile terminal, 8 acceleration sensor, 9 direction sensor, 10 storage unit, 11 route specifying unit, 12 receiving unit, 13 calculating unit, 14 determining unit, 15 call creating unit, 16 communicating unit, 17 display control unit, 18 selecting unit, 19 determining unit, 20 route recording unit, 21 boarding route specifying unit, 22 calculating unit, 23 condition creating unit, 24 moving time learning unit, 25 display, 25a OK button, 25b cancel button, 26 input device, 27 transmitting device, 28 registering unit, 29 assigning unit, 30 instructing unit, 31 time setting unit, 32 processor, 33 memory, 34 processor, 35 memory |

The invention claimed is:

1. An elevator system, including a group controller which controls a plurality of elevator devices as a group in response to call information from a mobile terminal, the mobile terminal having an acceleration sensor and a direction sensor which detects a particular direction on a horizontal plane, the elevator system comprising:

first processing circuitry configured to specify a route on which the mobile terminal has moved on the horizontal plane on the basis of at least one of the acceleration detected by the acceleration sensor and the direction detected by the direction sensor;

the first processing circuitry is configured to calculate an angle-related index as a part of a feature quantity of the specified route, the angle-related index being calculated using a vector representing an element or elements of the route and a vector connecting a position of a point on the element or elements of the route and a boarding position;

the first processing circuitry is configured to determine whether the specified route is a boarding route for boarding a car on the basis of the feature quantity; and the first processing circuitry is configured to transmit the call information in response to determining that the specified route is the boarding route; and second processing circuitry configured to register a call on the basis of the call information.

2. The elevator system according to claim 1, wherein the first processing circuitry is configured to calculate a distance-related index as a further part of the feature quantity of the specified route, the distance-related index is calculated using a position of the point on the element or elements of the route and the boarding position.

3. The elevator system according to claim 1, further comprising a transmitter configured to wirelessly transmit starting information, wherein the first processing circuitry is configured to receive the starting information from the transmitter, and the first processing circuitry is configured to start processing for specifying a route in response to receiving the starting information from the transmitter.

4. The elevator system according to claim 1, further comprising an input device used by a user to input starting information, wherein the first processing circuitry is configured to start processing for specifying a route when the starting information is input from the input device.

5. The elevator system according to claim 1, the first processing circuitry is configured to start processing for specifying a route when a particular acceleration pattern is detected by the acceleration sensor.

6. The elevator system according to claim 1, wherein the second processing circuitry is configured to determine an assigned car to the registered call, and the first processing circuitry is configured to cause information on the assigned car to be displayed on a display of the mobile terminal.

7. The elevator system according to claim 6, wherein the first processing circuitry is configured to cause a method for cancelling call registration to be displayed on the display when the information on the assigned car is received.

8. The elevator system according to claim 1, the second processing circuitry is configured to determine an assigned car to the registered call, and the second processing circuitry is configured to set time for keeping the assigned car in an open-door standby state at a boarding floor.

9. The elevator system according to claim 1, wherein the first processing circuitry is further configured to divide the specified route into a plurality of straight line segments, and to calculate the feature quantity based on an angle and a distance to the car of each of the plurality of straight line segments.

10. An elevator system, including a group controller which controls a plurality of elevator devices as a group in response to call information from a mobile terminal, the mobile terminal having an acceleration sensor and a direction sensor which detects a particular direction on a horizontal plane, the elevator system comprising:

a first processor and first memory configured to specify a route on which the mobile terminal has moved on the horizontal plane on the basis of at least one of the acceleration detected by the acceleration sensor and the direction detected by the direction sensor;

the first processor and first memory are configured to calculate an angle-related index as a part of a feature quantity of the specified route, the angle-related index being calculated using a vector representing an element or elements of the route and a vector connecting a position of a point on the element or elements of the route and a boarding position;

the first processor and first memory are configured to determine whether the specified route is a boarding route for boarding a car on the basis of the feature quantity;

the first processor and first memory are configured to transmit the call information in response to determining that the specified route is the boarding route; and a second processor and second memory configured to register a call on the basis of the call information.

* * * * *